Patented Feb. 24, 1953

2,629,745

UNITED STATES PATENT OFFICE 2,629,745

PROCESS FOR PREPARING 2-CHLORO-4-NITROPHENOL

Everett E. Gilbert, Flushing, and Jack V. Schurman, Bellaire, N. Y., assignors to Allied Chemical & Dye Corporation, New York, N. Y., a corporation of New York No Drawing. Application April 23, 1951, Serial No. 222,520

6 Claims. (Cl. 260—622)

This invention relates to an improved process for preparing 2-chloro-4-nitrophenol utilizable as a bactericide and/or fungicide.

It has been proposed to produce 2-chloro-4-nitrophenol by caustic hydrolysis of 1-nitro-3,4-dichlorobenzene. This process, however, is subject to the important disadvantage that the raw material is difficult to prepare pure, requiring laborious separation with consequent reduction in yield. Further proposals have been made to produce 2-chloro-4-nitrophenol by chlorination of 4-nitrophenol, but, to our knowledge, none has resulted in a commercially practicable process.

It is an object of this invention to provide an improved process for the production of 2-chloro-4-nitrophenol by chlorination of 4-nitrophenol. Another object of the invention is to recover as a by-product of such process, substantially pure aqueous hydrochloric acid solution. Other objects and advantages of the invention will appear hereinafter.

In accordance with the invention, 2-chloro-4-nitrophenol is manufactured by reacting 4-nitrophenol with chlorine in the presence of an aqueous hydrochloric acid solution at a temperature at which the 4-nitrophenol is molten. The reaction is represented by the following equation:

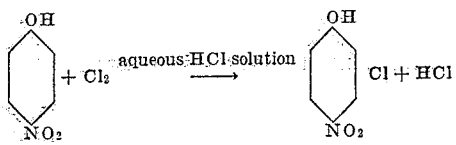

On completion of the chlorination reaction, and after cooling, if necessary, the reaction product appears as a crystalline slurry and is filtered to remove the desired 2-chloro-4-nitrophenol as a crystalline solid. After washing the 2-chloro-4-nitrophenol with water to extract any water-soluble compounds present, the product is then dried to constant weight and is ready for immediate use, without further treatment, as or in bactericidal or fungicidal preparations.

The present reaction may be carried out conveniently in a reactor provided with means for heating and cooling the contents of the reactor and equipped with a high speed stirrer, inlet tubes for charging gas, liquid and solid and a reflux condenser leading to a suitable scrubbing system.

Generally, any temperature at which the 4-nitrophenol is molten may be employed in the process of the invention. However, since temperatures below 70° C. are often incapable of maintaining the 4-nitrophenol in molten condition and those above 90° C. tend to favor decomposition reactions, we prefer to use temperatures within the range of about 70 to 90° C.

Time of reaction may vary greatly, say from about 1 to 10 hours, depending principally upon the particular temperature employed.

We have found that 2-chloro-4-nitrophenol crystallizes at a higher temperature from stronger aqueous hydrochloric acid solutions than from weaker aqueous hydrochloric acid solutions or water. This discovery makes possible the preparation of a purer 2-chloro-4-nitrophenol product since by employing the stronger aqueous hydrochloric acid solutions, crystallization of the product may be effected at higher temperatures at which unconverted starting material (and possibly by-products) have greater solubility in the aqueous phase. Accordingly, in the process of our invention, we prefer to employ aqueous hydrochloric acid solutions ranging in strength from about 20.0 to 35.0% by weight. The amount of aqueous hydrochloric acid solution used is preferably about 2 to 15 times that of the 4-nitrophenol employed, such amount resulting in the formation of a suspension of the 4-nitrophenol. Greater amounts of hydrochloric acid solution may be employed but are unnecessary and are usually undesirable since they have the disadvantage of increasing the volume of reaction mixture to be handled.

As may be seen from the above equation illustrating the reaction of the invention, 1 mol of hydrogen chloride is produced for every mol of 4-nitrophenol reacted. We have found that if an aqueous hydrochloric acid solution is employed which is saturated at the temperature of reaction, hydrogen chloride by-product is distilled out as vapors and may be conveniently collected in a water trap as substantially pure aqueous hydrochloric acid solution.

As is obvious to those skilled in the art, the process of the present invention is applicable to a recycle type operation in which the filtrate obtained when the 2-chloro-4-nitrophenol is isolated is charged with fresh 4-nitrophenol for the next run and constitutes a substantial part of the aqueous hydrochloric acid solution required therefor.

If required or desired, the 2-chloro-4-nitrophenol product produced by this invention may be converted into its sodium salt. This is accomplished, for example, by direct neutralization of a water slurry of the product with a caustic soda solution. The resulting neutral slurry can then be spray or drum dried and marketed with some sodium chloride content or the product filtered off and the mother liquor used for the next run.

The following examples describe ways in which the principle of the invention has been applied but is not to be construed as limiting the invention. Parts are by weight.

*Example 1*

235 parts of 36% aqueous hydrochloric acid solution, 89.8 parts of water and 60.0 parts of 4-nitrophenol were heated together in a reactor at 80° C. with vigorous stirring to produce an emulsion. 30.9 parts of chlorine were then added over the course of 2 hours at 80 to 85° C. Heating was continued with stirring for 30 minutes during which period the oily product crystallized. No hydrogen chloride was distilled out during the chlorination. The crystalline product was filtered, washed with water and air dried at room temperature to constant weight. The resulting product, having a pink appearance, was good quality 2-chloro-4-nitrophenol and constituted 70.5 parts (94.1% yield based on the 4-nitrophenol) melting at 101 to 109° C.

*Example 2*

27.0 parts of 4-nitrophenol were suspended in a mixture of 235 parts of 36% aqueous hydrochloric acid solution and 34.4 parts of water and the resulting mixture heated in a reactor at 65° C. with vigorous stirring. 13.5 parts of chlorine were then admitted over a period of 3 hours, the final temperature rising to 85° C. 7.5 parts of hydrogen chloride were collected in a water trap to form a substantially pure aqueous hydrochloric acid solution. Heating and stirring were then continued for 1½ hours. On cooling slightly, the reaction product crystallized. Upon filtration, washing and drying to constant weight at room temperature, 29.8 parts (88.4% yield based on the 4-nitrophenol) of good quality 2-chloro-4-nitrophenol, having a cream color and melting at 104 to 110° C., were obtained.

Although certain preferred embodiments of the invention have been disclosed for purpose of illustration, it will be evident that various changes and modifications may be made therein without departing from the scope and spirit of the invention.

We claim:

1. A process for preparing 2-chloro-4-nitrophenol which comprises reacting 4-nitrophenol with chlorine in the presence of an aqueous hydrochloric acid solution at a temperature at which the 4-nitrophenol is molten but below a temperature at which substantial decomposition occurs, and recovering the 2-chloro-4-nitrophenol formed from the aqueous hydrochloric acid solution.

2. A process for preparing 2-chloro-4-nitrophenol which comprises reacting 4-nitrophenol with chlorine in the presence of an aqueous hydrochloric acid solution ranging in strength from about 20.0 to 35.0% by weight at a temperature at which the 4-nitrophenol is molten but below a temperature at which substantial decomposition occurs, and recovering the 2-chloro-4-nitrophenol formed from the aqueous hydrochloric acid solution.

3. A process for preparing 2-chloro-4-nitrophenol which comprises reacting 4-nitrophenol with chlorine in the presence of an aqueous hydrochloric acid solution ranging in strength from about 20.0 to 35.0% by weight at about 70 to 90° C., and recovering the 2-chloro-4-nitrophenol formed from the aqueous hydrochloric acid solution.

4. A process for preparing 2-chloro-4-nitrophenol which comprises reacting 4-nitrophenol with chlorine in the presence of an aqueous hydrochloric acid solution ranging in strength from about 20.0 to 35.0% by weight at about 70 to 90° C., the quantity of hydrochloric acid solution being about 2 to 15 times that of the 4-nitrophenol, and recovering the 2-chloro-4-nitrophenol formed from the hydrochloric acid solution.

5. A process for preparing 2-chloro-4-nitrophenol which comprises reacting 4-nitrophenol with chlorine in the presence of an aqueous hydrochloric acid solution at a temperature at which the 4-nitrophenol is molten but below a temperature at which substantial decomposition occurs, the hydrochloric acid solution being saturated at the temperature of reaction, recovering vapors of hydrogen chloride formed as by-product, and recovering the 2-chloro-4-nitrophenol formed from the aqueous hydrochloric acid solution.

6. A process for preparing 2-chloro-4-nitrophenol which comprises reacting 4-nitrophenol with chlorine in the presence of an aqueous hydrochloric acid solution at a temperature at which the 4-nitrophenol is molten but below a temperature at which substantial decomposition occurs, the hydrochloric acid solution being saturated at the temperature of reaction, recovering vapors of hydrogen chloride formed as by-product by contacting them with water, and recovering the 2-chloro-4-nitrophenol formed from the aqueous hydrochloric acid solution.

EVERETT E. GILBERT.
JACK V. SCHURMAN.

REFERENCES CITED

The following references are of record in the file of this patent:

Bogdanov et al., Chem. Abstracts, vol. 39 (1945), col. 948 (1 page only).